No. 847,424. PATENTED MAR. 19, 1907.
E. MIER Y MIURA.
MEASURING APPARATUS FOR ELECTRICITY.
APPLICATION FILED DEC. 12, 1904.

2 SHEETS—SHEET 1.

Witnesses
Edgworth Greene
R. A. Etherson.

Eduardo Mier y Miura
Inventor
By his Attorney

No. 847,424. PATENTED MAR. 19, 1907.
E. MIER Y MIURA.
MEASURING APPARATUS FOR ELECTRICITY.
APPLICATION FILED DEC. 12, 1904.

2 SHEETS—SHEET 2.

Witnesses
Edgeworth Greene
R. A. Ettinson.

Eduardo Mier y Miura, Inventor
By his Attorney

UNITED STATES PATENT OFFICE.

EDUARDO MIER Y MIURA, OF MADRID, SPAIN.

MEASURING APPARATUS FOR ELECTRICITY.

No. 847,424.

Specification of Letters Patent.

Patented March 19, 1907.

Application filed December 12, 1904. Serial No. 236,612.

*To all whom it may concern:*

Be it known that I, EDUARDO MIER Y MIURA, a subject of the King of Spain, residing at Madrid, in the Province of New Castile, Spain, have invented a new and useful Improvement in Measuring Apparatus for Electricity, of which the following is a specification.

This invention relates to electric meters; and the general objects are to permit ready reading of the instrument and to provide means whereby errors, due to evaporation of the electrolyte, may be more efficiently guarded against than hitherto.

A further object is to so construct the instrument that it will be little liable to serious injury from breakage of the electrolyte-container.

Other advantages of the present construction will become apparent as the specification proceeds.

Figure 1:
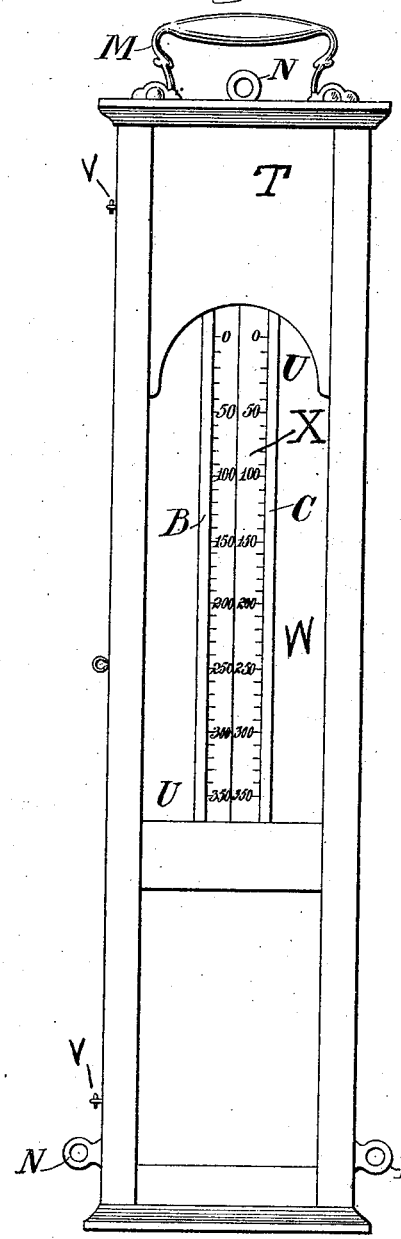
Figure 2:
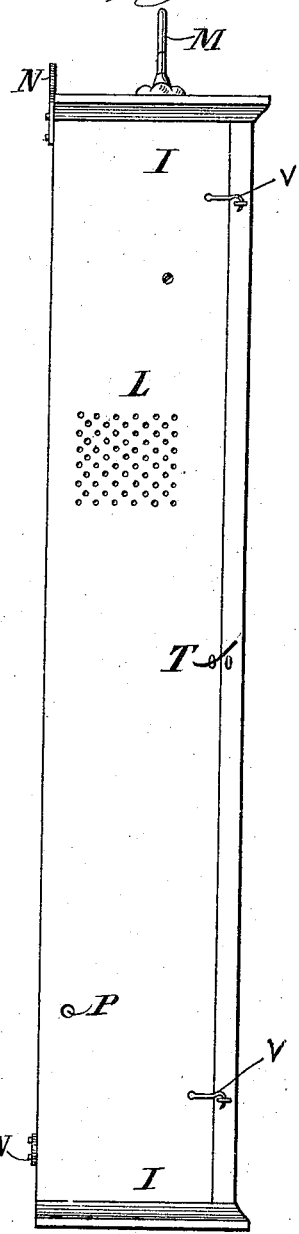
Figure 3:
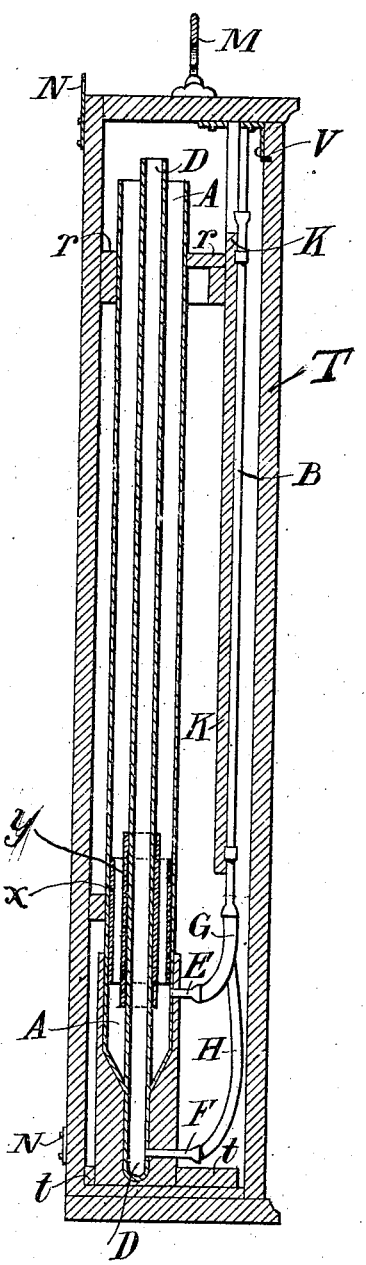
Figure 4:
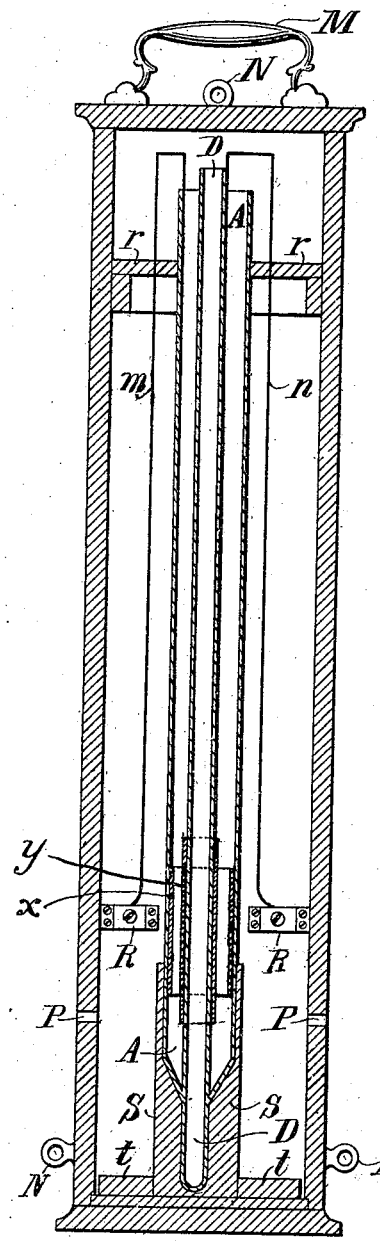

In the drawings, Figure 1 is a front elevation. Fig. 2 is a side elevation. Fig. 3 is a vertical longitudinal section, and Fig. 4 is a vertical transverse section.

Referring to these figures, I indicates the casing (shown as being constructed as an elongated upright box) having its top conveniently furnished with a carrying-handle M and its back with eyes N for permitting suspension of the instrument. The front T of the casing is desirably constituted in the nature of a door, and to this end is shown as being provided with catches $v$. The side walls of the casing are advantageously formed with ventilating-holes L.

In order to permit reading of the instrument without opening the casing, the lower portion W of the front T is desirably of glass. For the sake of rendering the casing more rigid during carrying the top has been illustrated as being furnished with a projecting metallic tongue V, which takes into a groove near the top of the front T when the latter is closed, thus applying some of the strain, due to the force of gravity, to the front as well as to the sides and back of the casing.

It will be understood that the features so far discussed relate more to matters of convenience than of essence.

Located preferably in the center of the rear of the casing is an upright tube A, which with the electrodes $x$ and $y$ constitute the electrolytic cell. This may be constructed of glass, or, since it is not necessary to read the height of the liquid through the walls of this member, of other material not liable to breakage. This inner tube D is arranged substantially concentric with the outer tube; but this expression "concentric" is not to be taken as implying that the tubes are necessarily cylindrical, as this is obviously not essential, although preferable. The tubes A and D are open at top and closed at bottom, and it is to be noted that there is no connection between them for the passage of liquid.

The tubes might be constructed in one piece, and are conveniently supported at the bottom in a hollow block or step S, the latter being reliably retained in position upon the bottom of the casing by means of an apertured slab $t$. At their upper ends the tubes are supported against lateral movement by means of an apertured shelf $r$, which surrounds the tube A.

The electrodes $x\ y$ are with advantage in the form of hollow concentric cylinders, the one conforming to the inner surface of the tube A and the other to the outside of the tube D. Preferably they are disposed toward the bottom of the tubes. Inasmuch as a great obstacle to the general adoption for commercial purposes of the voltameter of the laboratory has been the costliness of the platinum electrodes employed, I contemplate making the electrodes $x\ y$ of lead or antimony or of an alloy of these metals when the electrolyte is sulfuric acid in water or nickeled iron when the electrolyte is a solution of soda or caustic potash in water. It is essential, of course, that the electrodes shall not be soluble in the electrolyte. Carbon may be used as the material of the cathode.

The electrodes are connected with suitably insulated conductors $m\ n$, and the latter lead to terminals R, conveniently disposed on the interior of the casing. Holes P through the sides of the casing constitute a means of permitting the insertion of the necessary wires to connect with the terminals R.

In rear of the transparent portion of the front T is a double vertical scale X, at either margin of which are transparent upright indicating-tubes B C. The latter are supported upon a suitable member K and are in communication with the lower portion of the interior of tubes A and D, respectively, by means of connections G H and side tubes E F.

In the use of the instrument the tubes A and D are both filled to a suitable height with electrolyte. As will be obvious, it will simplify readings to have the initial heights of the two columns the same. When part or all of the service-current passes through the electrolyte in the annular space between the two tubes, the water therein is decomposed, the gases pass off through the ventilating-holes in the casing, and the height of the liquid in the annular space and also in the indicating-tube B falls. It will be obvious that the graduations of the scale which are adjacent the tube B may be so arranged that they will read directly to electrical units. Meanwhile evaporation has been going on, and therefore some of the sinking of the level of the liquid in the tubes A and B must be attributed to this cause. The amount of evaporation is indicated by tube C in communication with tube D. The latter has no communication with the annular space between tubes and is therefore unaffected by electrolytic action. It will be apparent that if the cross-sectional area of the annular space referred to and of the inner tube D are the same the graduations of the two sides of the scale X may be equal. Otherwise the spaces between the graduation-marks adjacent the tube C will be suitably arranged. In order to obtain a reading as to the quantity of electricity that will have passed in a given time, it will be necessary only to subtract the reading of tube C from that of tube B.

It is desired to point out that the arrangement of the tubes A and D concentric with each other tends to equalize conditions of temperature in the electrolytic cell and in the evaporating-tube. It is likewise to be noted as an important feature of the invention that the main tubes A and D are removed to an unexposed portion of the instrument, where, if made of glass or similar fragile material, they will be comparatively safe from damage. For this reason the employment of special indicating-tubes is a great advantage. If the latter become broken, they may be removed from their connections and new ones inserted without affecting the remainder of the instrument and without entailing material expense. From another point of view the provision of special transparent indicating-tubes of comparatively small bore permits the larger and more costly tubes constituting the electrolytic cell and the evaporating element to be made of some durable material, whereby damage thereto is most effectually guarded against.

What is claimed as new is—

1. In an apparatus for measuring electricity, the combination of an upright tube and electrodes constituting an electrolytic cell, an upright evaporating-tube immediately adjacent the first-named tube and adapted to receive a portion of the electrolyte without permitting such portion to be subjected to electrolytic action, an upright transparent indicating-tube connected with the first-named tube, a similar tube in communication with the evaporating-tube, and a scale associated with said indicating-tubes.

2. In an apparatus for measuring electricity, the combination with a casing having a transparent front, of two upright tubes removed from said front and constructed and arranged to contain distinct bodies of electrolyte under the same conditions of temperature, means whereby a current is passed through the electrolyte in one of the tubes, and upright transparent indicating-tubes in communication with said other tubes and located adjacent said transparent front.

3. In an apparatus for measuring electricity, the combination of two concentric upright tubes constructed to receive isolated bodies of electrolyte, tubular electrodes within the space between said tubes, a pair of upright indicating-tubes, connections between the interior of the first-named tubes and said indicating-tubes whereby the electrolyte occupies the latter also, and a scale associated with the indicating-tubes.

In testimony whereof I have hereunto set my hand in presence of two subscribing witnesses.

EDUARDO MIER Y MIURA.

Witnesses:
BERNARDO CABAÑAS Y CHAVARRIER,
R. DE SALVASORA.